United States Patent Office 3,795,742
Patented Mar. 5, 1974

3,795,742
PHARMACEUTICAL PREPARATIONS
Hannelore Helfer, Basel, Roland Jaques, Allschwil, Basel-Land, and Bernhard Noelpp, Basel, Switzerland, assignors to Ciba-Geigy Corporation
No Drawing. Filed Oct. 6, 1971, Ser. No. 187,199
Claims priority, application Switzerland, Oct. 21, 1970, 15,554/70
Int. Cl. A61k 27/00
U.S. Cl. 424—311                                    15 Claims

ABSTRACT OF THE DISCLOSURE

A pharmaceutical preparation which comprises a compound of the general formula

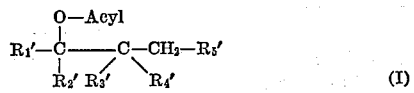

wherein $R_1'$ denotes an aryl radical, $R_2'$ denotes an aralkyl radical, $R_3'$ denotes the methyl radical and $R_4'$ denotes a hydrogen atom, or $R_3'$ and $R_4'$ together represent a methylene radical and $R_5'$ denotes an aliphatic tertiary amino group, in the free form or in the form of its nontoxic salt in admixture with a 9- or 11-(aminoalkoxy)-9,10-dihydro-9-10-ethanoanthracene or 11-(aminoalkylidene)-9,10-dihydro-9,10-ethanoanthracene or 11- or 9-(aminoalkyl) - 9,10 - dihydro - 9,10-ethanoanthracene or -ethenoanthracene in the free form or in the form of its physiologically tolerable salt, is useful as analgetic.

The present invention relates to pharmaceutical preparations having an analgesic action.

The invention provides a pharmaceutical preparation which comprises a compound of the general formula

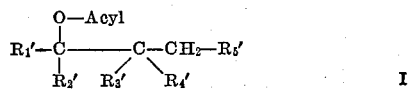                                    I wherein $R_1'$ denotes an aryl radical, $R_2'$ denotes an aralkyl radical, $R_3'$ denotes the methyl radical and $R_4'$ denotes a hydrogen atom, or $R_3'$ and $R_4'$ together represent a methylene radical and $R_5'$ denotes an aliphatic tertiary amino group, in admixture with a 9- or 11-(aminoalkoxy)-9,10-dihydro - 9,10-ethanoanthracene or 11-(aminoalkylidene)-9,10 - dihydro-9,10-ethanoanthracene or 11- or especially 9-(aminoalkyl) - 9,10 - dihydro-9,10-ethano- or etheno-anthracene.

It is known that the compounds of the general Formula I have an analgesic action, but their activity is substantially increased in a synergistic manner by admixture with the psycho-pharmacologically active etheno- and ethano-anthracenes.

The ethano-anthracenes and etheno-anthracenes mentioned can be substituted or unsubstituted at the aromatic carbocyclic rings (positions 1 to 8). Possible substituents are especially lower alkyl, alkoxy, alkenyloxy and/or alkylmercapto groups, lower alkylsulphonyl and/or alkanoyl groups, hydroxy, acyloxy, nitro, sulphamyl, acylamino and/or amino groups, but above all trifluoromethyl groups or halogen atoms, for example, fluorine, bromine and iodine atoms, and advantageously chlorine atoms. As alkyl groups methyl, ethyl, propyl, isopropyl, butyl, i-butyl and tert.-butyl should especially be mentioned, as alkoxy or alkenyloxy groups the methoxy, ethoxy, allyloxy or methylenedioxy group should be mentioned, as alkylmercapto groups the methylmercapto or ethylmercapto group should be mentioned and as alkanoyl radicals the acetyl, propionyl and butyryl radical should above all be mentioned. Acyl radicals in the acyloxy and acylamino groups are preferably lower alkanoyl radicals, for example, those mentioned above, benzoyl radicals and phenyl-lower alkanoyl radicals, for example, phenylacetyl radicals. The phenyl rings of these radicals can also be substituted, for example, as indicated for the positions 1 to 8. The substitution in the positions 1 to 8 can be multiple, but is preferably double and advantageously single. Preferred positions for substituents are the 3-position and advantageously the 2-position.

The 9-aminoalkyl and 9-aminoalkoxy compounds mentioned can be substituted in the 10-position, and the 11-aminoalkyl, 11-aminoalkoxy and 11-aminoalkylidene compounds mentioned can be substituted in the 9- and/or 10-position. Substituents are here preferably lower alkyl radicals, for example, those mentioned above, especially methyl groups, or halogen atoms, especially chlorine atoms.

The amino group of the aminoalkyl, aminoalkoxy and aminoalkylidene radicals is especially a secondary or tertiary amino group.

An N-monosubstituted amino group is described as a secondary amino group and an N-disubstituted amino group is described as a tertiary group. Possible substituents are, above all, hydrocarbon radicals of aliphatic character which can also be interrupted by 1 or more hetero-atoms, for example, oxygen, sulphur or nitrogen atoms, and/or substituted by 1 or more hydroxyl groups. Hydrocarbon radicals of aliphatic character are radicals of which the first member, linked to the nitrogen atom, is not a member of an aromatic system. Radicals of this nature are especially aliphatic or cycloaliphatic hydrocarbon radicals and especially lower radicals of this nature.

The term "lower aliphatic hydrocarbon radicals" is applied to radicals which contain not more than 8 carbon atoms. The term "lower cycloaliphatic hydrocarbon radicals" is applied to radicals which possess not more than 7 ring carbon atoms. The word "lower" in conjunction with other groups containing carbon is, in the following text, to be understood in the same sense as has just been indicated for hydrocarbon radicals. The hydrocarbon radicals can be saturated or unsaturated.

As hydrocarbon radicals of the indicated type, the following are preferred: lower alkyl and alkenyl radicals, especially radicals with not more than 6 carbon atoms, for example, methyl, ethyl, propyl and isopropyl, straight- and branched-chain butyl, pentyl and hexyl radicals bonded in any desired position; lower hydroxyalkyl radicals, for example, 2-hydroxyethyl and 3-hydroxypropyl radicals; allyl and methallyl radicals; unsubstituted and lower alkyl-substituted lower cycloalkyl and cycloalkenyl radicals, for example, cyclopentyl, cyclohexyl, cycloheptyl, cyclopentenyl and cyclohexenyl radicals, and unsubstituted and lower alkyl-substituted lower cycloalkyl- and alkenyl-alkyl radicals, for example, cyclopentyl- and cyclohexenyl-methyl, -ethyl and -propyl radicals.

Divalent radicals are above all alkylene, oxaalkylene, thiaalkylene and azaalkylene radicals which can be unsubstituted or substituted by hydroxyl groups, for example, butylene-(1,4), pentylene-(1,5), heptylene-(2,7), heptylene-(2,6), 3-oxapentylene-(1,5), 3-thiapentylene-(1,5), 2,4 - dimethyl-3-thiapentylene-(1,5), 3-aza-pentylene-(1,5), 3-lower alkyl - 3-aza-pentylene-(1,5), such as 3-methyl-3-aza-pentylene-(1,5), 3-(hydroxy-lower alkyl)-3-azapentylene-(1,5), such as 3-($\beta$-hydroxyethyl)-3-azapentylene-(1,5), 3-oxahexylene-(1,6) or 3 - acahexylene-(1,6) radicals.

The amino group is accordingly, for example, an N-lower alkyl-N-cycloalkylamino group, for example the N-methyl-N-cyclopentylamino or cyclohexylamino group; a pyrrolidino or piperidino group which is unmodified or C-lower alkylated and/or $\beta$-singly unsaturated in the ring; a piperazino, N'-lower alkyl-piperazino, for example, N'-methyl-piperazino, or N'-(hydroxy-lower alkyl)-piperazino, for example, N'-(β-hydroxyethyl)-piperazino, thiomorpholino or morpholino group which may be C-lower alkylated, or preferably a mono- or di-lower alkylamino group, for example, the monopropylamino or dipropylamino group or, advantageously, a monoethylamino, diethylamino or N-methyl-N-ethylamino group, but above all the dimethylamino group or very particularly the monomethylamino group.

In the 9- or 11-aminoalkyl compounds mentioned, the alkylene radical bonding the amino group to the cyclic nucleus is above all a lower, straight- or branched-chain alkylene radical which separates the amino group and the anthracene nucleus by from 1 to 4, especially from 1 to 3 and preferably 1 or 3 carbon atoms, for example, the methylene, 1,2-ethylene, 1,3-butylene, 2,3-butylene or 1,4-butylene radical. Preferred radicals are the methylene radical and the 1,3-propylene radical.

In the 11-aminoalkylidene compounds mentioned, the alkyl-ylidene radical which bonds the amino group to the cyclic nucleus is, for example, a radical corresponding to the above-mentioned radicals which is doubly bonded to the nucleus and which separates the amino group from the double bond by at least 2 carbon atoms.

In the aminoalkoxy compounds mentioned, the alkylene radical bonding the oxygen atom to the nitrogen atom is preferably a lower, straight- or branched-chain alkylene radical, preferably with from 2 to 4 carbon atoms, the terminal amino group being separated from the oxygen atom located on the nucleus by at least two carbon atoms, such for example, as the propylene-(1,2), propylene-(1,3), butylene-(1,2), butylene-(1,3), butylene-(2,3) or butylene-(1,4) radical, or advantageously a radical of this nature with two carbon atoms, for example, an ethylene-(1,2) radical.

The 9,10-dihydro-9,10-etheno-anthracenes or ethanoanthacenes mentioned can, furthermore, be substituted in the etheno or ethano bridge by lower alkyl radicals, for example, those mentioned above, especially methyl radicals, but are preferably unsubstituted.

The 9-aminoalkyl-9,10-dihydro-9,10-ethano-anthracenes mentioned can additionally possess a hydroxyl group, oxo group or acyloxy group in the ethano bridge in the position adjacent to the 9-position (that is to say in the 12-position).

Acyloxy groups are hydroxyl groups substituted by carboxylic acid radicals, for example, aliphatic or aromatic carboxylic acid radicals, for example, hydroxyl groups esterified by benzoic acids, for example, the benzoyloxy group, or especially lower alkanoyloxy groups, preferably those with at most 6 carbon atoms, for example, propionyloxy, butyryloxy, caproyloxy or above acetoxy groups.

In the general Formula I, the acyl radical is especially a lower alkanoyl radical, for example, butyryl radical or preferably an acetyl or propionyl radical.

Aryl radicals are especially phenyl radicals. Aralkyl radicals are especially phenyl-lower alkyl radicals, for example, benzyl or 1- or 2-phenylethyl radicals. The aryl and aralkyl radicals mentioned can be unsubstituted, or possess one, two or more substituents, in the aromatic ring. Substituents can be, for example, lower alkyl radicals, for example, methyl, ethyl, propyl or isopropyl radicals or straight- or branched-chain butyl radicals bonded in any desired position, lower alkoxy groups, especially methoxy, ethoxy, propoxy or butoxy groups and halogen atoms, especially fluorine, chlorine or bromine atoms or the trifluoromethyl group.

A possible aliphatic tertiary amino group $R_5'$ is an amino group which is substituted by a divalent radical or two monovalent radicals of aliphatic character. Substituents of the amino group can be especially alkyl radicals, for example, lower alkyl radicals, for example, those mentioned, or straight- or branched-chain alkylene radicals for example, butylene-(1,4), pentylene-(1,5), 1,5-dimethyl-pentylene-(1,5), hexylene-(1,6), hexylene-(1,5) or oxaalkylene, azaalkylene or thiaalkylene radicals, especially those which together with the nitrogen atom result in at most 8 ring members, for example, 3-oxa- or -thiapentylene-(1,5), 3-methyl-3-azahexylene-(1,6), 3-ethyl-1,5-dimethyl-3-azapentylene-(1,5) or 3-methyl-3-aza-pentylene-(1,5).

The tertiary aliphatic amino group is above all a pyrrolidino, piperidino, morpholino, thiamorpholino or N'-lower alkylpiperazino group, for example, the N'-methylpiperazino group, but especially a di-lower alkylamino group, for example, the diethylamino group or preferably the dimethylamino group.

The ethano-anthracene and etheno-anthracene compounds mentioned, and the compounds of the general Formula I, can, depending on the number of their asymmetric carbon atoms, be in the form of isomeric mixtures, pure isomers (racemates) or optical antipodes. Preferably, they are in each case used in the form of the more active or less toxic isomer or antipode.

The ethano-anthracene and etheno-anthracene compounds mentioned as well as the compounds of the general Formula I can be, furthermore, in the free form or in the form of their physiologically tolerable salts. Possible salts of this nature are especially salts with organic or inorganic acids, for example: hydrogen halide acids, acids of sulphur, acids of phosphorus, nitric acid, perchloric acid, aliphatic alicyclic, aromatic or heterocyclic carboxylic or sulphonic acids, for example, formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic acid, methanesulphonic, ethanesulphonic, hydroxyethanesulphonic and ethylenesulphonic acid; halogenobenzenesulphonic, toluenesulphonic, naphthalenesulphonic acid or sulphanilic acid; cyclohexyl-sulphamic acid, methionine, tryptophane, lysine or arginine.

As has been mentioned, the analgesic effect of the compounds of the general Formula I is substantially increased by admixing the ethano-anthracene or etheno-anthracene compounds mentioned. In this way, either an increased effect of the compound of the general Formula I or a reduction in the dosage required for a certain effect is achievable.

The invention, therefore, provides pharmaceutical preparations which contain an analgesically active compound of the general Formula I together with a psychopharmacologically active 9- or 11-(aminoalkylidene)-9,10-dihydro-9,10-ethano-anthracene or 11- or especially 9-(aminoalkyl)-9,10-dihydro-9,10-ethano- or -etheno-anthracene, as well as the manufacture of these preparations, and also the use of these substances in the form of the said preparations, or by combined or separate application, for reducing pain.

As 9-(aminoalkoxy) - 9,10 - dihydro-9,10-ethanoanthracenes there should especially be mentioned the compounds of the formula

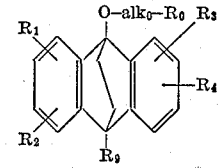

(II)

wherein $R_1$, $R_2$, $R_3$ and $R_4$ denote lower alkyl radicals, especially methyl radicals; lower alkoxy radicals, especially methoxy radicals; halogen atoms, especially chlorine atoms; trifluoromethyl groups; nitro groups; amino groups or hydrogen atoms, with preferably two or especially three of the above symbols representing a hydrogen atom, $R_9$ represents a lower alkyl group, a chlorine atom or especially a hydrogen atom, $alk_0$ denotes a lower alkylene radical which separates $R_0$ from the oxygen atom by at least 2 carbon atoms, especially the 1,2-ethylene or 1,3-propylene radical and $R_0$ denotes a pyrrolidino, piperidino, morpholino, thiomorpholino, N'-methylpiperazino, N'-(β-hydroxyethyl)-piperazino or piperazino group which may be C-lower alkylated or above all a mono- or di-lower alkylamino group, especially a monomethylamino or di-methylamino group.

Among this group of compounds, the following compounds should especially be mentioned:

9-(2-dimethylaminoethoxy)-9,10-dihydro-9,10-ethanoanthracene,
9-(2-diethylaminoethoxy)-9,10-dihydro-9,10-ethanoanthracene,
9-(2-dimethylamino-1-methyl-ethoxy)-9,10-dihydro-9,10-ethanoanthracene,
2-chloro-9-(2-dimethylaminoethoxy)-9,10-dihydro-9,10-ethanoanthracene,
2-chloro-9-(2-methylaminoethoxy)-9,10-dihydro-9,10-ethanoanthracene,
9-(2-methylaminoethoxy)-9,10-dihydro-9,10-ethanoanthracene,
9-(3-dimethylaminopropoxy)-9,10-dihydro-9,10-ethanoanthracene,
9-[γ-(N'-methylpiperazino)-propoxy]-9,10-dihydro-9,10-ethanoanthracene,
2-methoxy-9-(2-dimethylaminoethoxy)-9,10-dihydro-ethanoanthracene,
4-chloro-9-(2-dimethylaminoethoxy)-9,10-dihydro-9,10-ethanoanthracene,
2-methyl-9-(2-dimethylaminoethoxy)-9,10-dihydro-9,10-ethanoanthracene,
2-methyl-9-(2-pyrrolidinoethoxy)-9,10-dihydro-9,10-ethanoanthracene,
10-methyl-9-(2-dimethylaminoethoxy)-9,10-dihydro-9,10-ethanoanthracene,
9-(2-piperidinoethoxy)-9,10-dihydro-9,10-ethanoanthracene and
9-(2-morpholinoethoxy)-9,10-dihydro-9,10-ethano-anthracene.

Additionally, 1-methyl-2-[(9,10 - dihydro-9,10 - ethano-9-anthryloxy)-methyl]-piperidine should also be mentioned as a 9-aminoalkoxy compound.

Possible 11-(aminoalkoxy) - 9,10 - dihydro - 9,10-ethanoanthracenes are especially the compounds of the formula

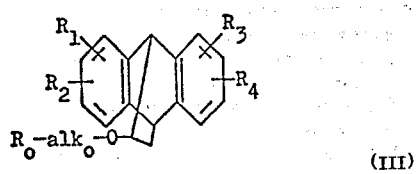

(III)

wherein $R_0$, $alk_0$, $R_1$, $R_2$, $R_3$ and $R_4$ have the indicated meanings. As an example of this class of compounds, 11-(3-dimethylaminopropoxy) - 9,10 - dihydro-9,10-ethanoanthracene should especially be mentioned.

Preferably, however, those compounds are used in which the aminoalkyl or aminoalkylidene radical is directly bonded to the ethanoanthracene or ethenoanthracene nucleus, that is to say 11-(aminoalkylidene)-9,10-dihydro-9,10 - ethanoanthracenes or 11- or especially 9-(aminoalkyl)-9,10-dihydro-9,10-ethano- or -ethenoanthracenes.

As 11-(aminoalkylidene) - 9,10 - dihydro-9,10-ethanoanthracenes, compounds of the formula

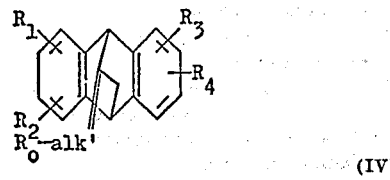

(IV)

may for example be mentioned, wherein $R_0$, $R_1$, $R_2$, $R_3$ and $R_4$ have the indicated meanings and alk' denotes a lower alkylylidene radical, wherein the amino group $R_0$ is separated from the double bond by at least 2 carbon atoms, especially a radical of the formula

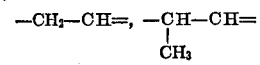

or $-CH_2-CH_2-CH=$.

As examples of this group of compounds, the following may, for example, be mentioned:

trans-11-(2-dimethylaminoethylidene)-9,10-dihydro-9,10-ethanoanthracene,
cis-11-(2-dimethylaminoethylidene)-9,10-dihydro-9,10-ethanoanthracene,
trans-11-(3-dimethylaminopropylidene)-9,10-dihydro-9,10-ethanoanthracene,
trans-11-(2-methylaminoethylidene)-9,10-dihydro-9,10-ethanoanthracene,
trans-11-(2-piperidinoethylidene)-9,10-dihydro-9,10-ethanoanthracene,
trans-11-(2-dimethylaminopropylidene)-9,10-dihydro-9,10-ethanoanthracene,
trans-2-chloro-11-(2-dimethylaminoethylidene)-9,10-dihydro-9,10-ethanoanthracene,
trans-3-chloro-11-(2-dimethylaminoethylidene)-9,10-dihydro-9,10-ethanoanthracene and
trans-11-[2-(4-methylpiperazino)-ethylidene]-9,10-dihydro-9,10-ethanoanthracene.

As 11-(aminoalkyl) - 9,10 - dihydro-9,10-ethano-anthracenes as well as -ethenoanthracenes, the compounds of the formula

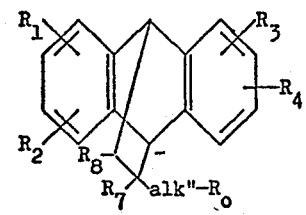

(V)

should especially be mentioned, wherein $R_0$, $R_1$, $R_2$, $R_3$ and $R_4$ have the indicated meanings, alk'' denotes a lower alkylene radical, above all with from 1 to 3 carbon atoms, for example, the radical of the formula

wherein $n$ represents 1, 2 or 3, and $R_7$ and $R_8$ denote lower alkyl radicals or above all hydrogen atoms or together represent a second bond.

Among this group of compounds, the following, which may, where relevant, be present in the racemic form or in the form of their optical antipodes, can, for example, be used:

11-(morpholinomethyl)-9,10-dihydro-9,10-ethanoanthracene,
11-(diethylaminomethyl)-9,10-dihydro-9,10-ethanoanthracene,
11-[N'-(β-hydroxyethyl)-piperazinomethyl]-9,10-dihydro-9,10-ethanoanthracene,
11-[2-(N'-(β-hydroxyethyl)-piperazino)-ethyl]-9,10-dihydro-9,10-ethanoanthracene,
11-(piperazinomethyl)-9,10-dihydro-9,10-ethano-anthracene,
11-(N'-methylpiperazinomethyl)-9,10-dihydro-9,10-ethanoanthracene,
11-[α-(methylamino)-ethyl]-9,10-dihydro-9,10-ethanoanthracene,
11-[1-(dimethylamino)-ethyl]-9,10-dihydro-9,10-ethanoanthracene,
11-(β-dimethylaminoethyl)-9,10-dihydro-9,10-ethanoanthracene, 11-(β-diethylaminoethyl)-9,10-dihydro-9,10-ethanoanthracene,
11-(β-methylaminoethyl)-9,10-dihydro-9,10-ethanoanthracene,
11-(β-piperidinoethyl)-9,10-dihydro-9,10-ethanoanthracene,
1,3,6,8-tetranitro-11-(dimethylaminomethyl)-9,10-ethenoanthracene,
11-(diethylaminomethyl)-9,10-dihydro-9,10-ethenoanthracene,
11-(pyrrolidinomethyl)-9,10-dihydro-9,10-ethanoanthracene,
1-chloro-11-(dimethylaminomethyl)-9,10-dihydro-9,10-ethenoanthracene,
4-chloro-11-(dimethylaminomethyl)9,10-dihydro-9,10-ethenoanthracene,
2-chloro-11-(dimethylaminomethyl)-9,10-dihydro-9,10-ethenoanthracene,
3-chloro-11-(dimethylaminomethyl)-9,10-dihydro-9,10-ethenoanthracene and
11-(α-dimethylaminoethyl)-9,10-dihydro-9,10-ethenoanthracene and also, preferably, the following compounds:

11-(dimethylaminomethyl)-11-methyl-9,10-dihydro-9,10-ethanoanthracene,
1-chloro-11-(dimethylaminomethyl)-9,10-dihydro-9,10-ethanoanthracene,
4-chloro-11-(dimethylaminomethyl)-9,10-dihydro-9,10-ethanoanthracene,
11-(methylaminomethyl)-9,10-dihydro-9,10-ethanoanthracene,
4-chloro-11-(methylaminomethyl)-9,10-dihydro-9,10-ethanoanthracene,
1-chloro-11-(methylaminomethyl)-9,10-dihydro-9,10-ethanoanthracene,
11-(γ-dimethylaminopropyl)-9,10-dihydro-9,10-ethanoanthracene,
11-(γ-methylaminopropyl)-9,10-dihydro-9,10-ethanoanthracene,
11-(methylaminomethyl)-9,10-dihydro-9,10-ethanoanthracene,
11-(β-methylaminoethyl)-9,10-dihydro-9,10-ethenoanthracene,
11-(γ-dimethylaminopropyl)-9,10-dihydro-9,10-ethenoanthracene and above all the following compounds 11-(dimethylaminomethyl)-9,10-dihydro-9,10-ethanoanthracene,
11-(methylaminomethyl)-9,10-dihydro-9,10-ethanoanthracene,
11-(dimethylaminomethyl)-9,10-dihydro-9,10-ethenoanthracene and
11-(β-dimethylaminoethyl)-9,10-dihydro-9,10-ethenoanthracene.

Of particular value for augmenting the analgesic action of the compounds of the general Formula I, however, are the compounds of the formula

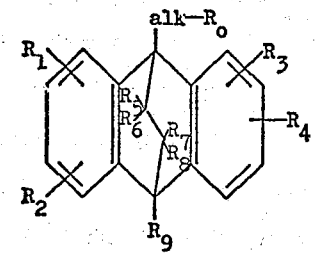

(VI)

wherein alk denotes a lower alkylene radical, especially a lower alkylene radical which separates $R_0$ from the nucleus by 1 or 3 carbon atoms, above all the methylene or 1,3-propylene radical, $R_1$, $R_2$, $R_3$ and $R_4$ denote lower alkyl radicals, especially methyl radicals; lower alkoxy radicals, especially methoxy radicals, hydroxyl groups; halogen atoms, especially chlorine atoms; trifluoromethyl groups, nitro groups, amino groups or hydrogen atoms, with preferably two or especially three of the said symbols representing a hydrogen atom, $R_5$ denotes a hydrogen atom, a lower alkyl radical, above all a methyl radical, a hydroxyl group or a lower alkanoyloxy group, above all an acetoxy group, $R_6$ denotes a hydrogen atom or a lower alkyl radical or $R_5$ and $R_6$ together represent an oxo group, $R_7$ and $R_8$ represent lower alkyl radicals, for example methyl radicals or especially represent hydrogen atoms, or $R_6$ and $R_7$ have the indicated meanings and $R_5$ and $R_8$ together represent a second bond and $R_0$ denotes a pyrrolidino piperidino, morpholino, thiomorpholino, N'-methyl-piperazino, N'-(β-hydroxyethyl)- piperazino or piperazino group which may be C-alkylated or above all a mono- or di-lower alkylamino group, especially a monoethylamino or dimethylamino group.

Among this group of compounds, there may especially be mentioned:

9-(ethylaminomethyl)-12-hydroxy-9,10-dihydro-9,10-ethanoanthracene,
9-(diethylaminomethyl)-12-hydroxy-9,10-dihydro-9,10-ethanoanthracene,
9-(dimethylaminomethyl)-12-hydroxy-9,10-dihydro-9,10-ethanoanthracene,
9-(γ-methylaminopropyl)-12-hydroxy-9,10-dihydro-9,10-ethano-anthracene,
9-(dimethylaminomethyl)-12-oxo-9,10-dihydro-9,10-ethanoanthracene,
9-(dimethylaminomethyl)-12-acetoxy-9,10-dihydro-9,10-ethanoanthracene,
9-(ethylaminomethyl)-12-oxo-9,10-dihydro-9,10-ethanoanthracene,
9-(γ-piperidinopropyl)-9,10-dihydro-9,10-ethanoanthracene,
9-[γ-(2,6-dimethylthiomorpholino)-propyl]-9,10-dihydro-9,10-ethano-anthracene,
9-(diethylaminomethyl)-9,10-dihydro-9,10-ethano-anthracene,
9-(dimethylaminomethyl)-9,10-dihydro-9,10-ethano-anthracene,
9-(N-methylethylaminomethyl)-9,10-dihydro-9,10-ethanoanthracene,
9-(γ-dimethylaminopropyl)-9,10-dihydro-9,10-ethanoanthracene,
2-chloro-9-(methylaminomethyl)-9,10-dihydro-9,10-ethano-anthracene,
1,5-dichloro-9-(dimethylaminomethyl)-9,10-dihydro-9,10-ethanoanthracene,
10-chloro-9-(γ-dimethylaminopropyl)-9,10-dihydro-9,10-ethanoanthracene,
10-chloro-9-(ethylaminomethyl)-9,10-dihydro-9,10-ethanoanthracene,
10-chloro-9-(diethylaminomethyl)-9,10-dihydro-9,10-ethanoanthracene,
2-chloro-9-(dimethylaminomethyl)-9,10-dihydro-9,10-ethanoanthracene,
2-chloro-9-(diethylaminomethyl)-9,10-dihydro-9,10-ethanoanthracene,
2-chloro-9-(γ-dimethylaminopropyl)-9,10-dihydro-9,10-ethanoanthracene,
3-chloro-9-(γ-dimethylaminopropyl)-9,10-dihydro-9,10-ethanoanthracene,
3-chloro-9-(γ-methylaminopropyl)-9,10-dihydro-9,10-ethanoanthracene,
2-chloro-9-(γ-methylaminopropyl)-9,10-dihydro-9,10-ethanoanthracene,
9-{γ-[N'-(β-hydroxyethyl)-piperazino]-propyl}-9,10-dihydro-9,10-ethanoanthracene,
10-chloro-9-(methylaminomethyl)-9,10-dihydro-9,10-ethanoanthracene, 10-chloro-9-(dimethylaminomethyl)-9,10-dihydro-9,10-ethanoanthracene,
2-hydroxy-9-(dimethylaminomethyl)-9,10-dihydro-9,10-ethanoanthracene,
2-hydroxy-9-(methylaminomethyl)-9,10-dihydro-9,10-ethanoanthracene,
2-hydroxy-9-(γ-methylaminopropyl)-9,10-dihydro-9,10-ethanoanthracene,
2-hydroxy-9-(γ-dimethylaminopropyl)-9,10-dihydro-9,10-ethanoanthracene,
2-nitro-9-(methylaminomethyl)-9,10-dihydro-9,10-ethanoanthracene,
2-amino-9-(methylaminomethyl)-9,10-dihydro-9,10-ethanoanthracene,
2-nitro-9-(dimethylaminomethyl)-9,10-dihydro-9,10-ethanoanthracene,
2-amino-9-(dimethylaminomethyl)-9,10-dihydro-9,10-ethanoanthracene,
2-methoxy-9-(dimethylaminomethyl)-9,10-dihydro-9,10-ethanoanthracene,
2-methoxy-9-(methylaminomethyl)-9,10-dihydro-9,10-ethanoanthracene,
9-(γ-dimethylaminopropyl)-9,10-dihydro-9,10-ethenoanthracene and
9-(dimethylaminomethyl)-9,10-dihydro-9,10-ethenoanthracene.

Among this group of compounds, particularly valuable compounds are those of the formulae

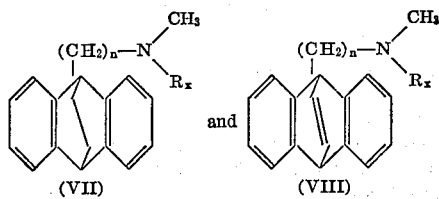

wherein $n$ represents 1 or 3 and $R_x$ denotes a methyl radical or a hydrogen atom, and very particularly 9-(γ-methylaminopropyl)-9,10-dihydro-9,10-ethenoanthracene, 9-(methylamino-methyl)-9,10-dihydro-9,10-ethenoanthracene and, above all, 9-(methylaminomethyl)-9,10-dihydro-9,10-ethanoanthracene and 9-(γ-methylaminopropyl)-9,10-dihydro-9,10-ethanoanthracene.

Possible compounds of the Formula I are especially the α-forms (which, as indicated above, can be in the racemic form or in the form of the optical antipodes), of the compounds of the formula

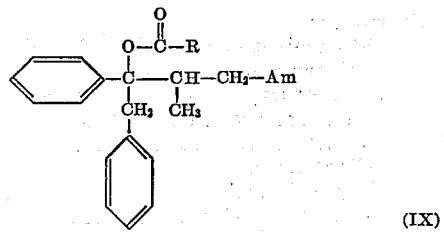

wherein R denotes the methyl, ethyl or cyclopropyl radical and Am denotes the dimethylamino or pyrrolidino group, above all α-1,2-diphenyl-2-propionyloxy-3-methyl-4-dimethylamino-butane, especially in its dextro-rotary form.

Further, the compounds of the formula

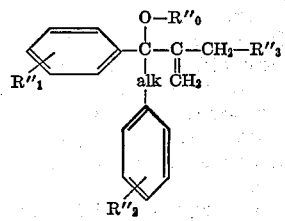

can preferably be used, wherein $R''_0$ represents a lower alkanoyl radical with at most 4 carbon atoms, $R''_1$ and $R''_2$ represent lower alkyl radicals, lower alkoxy groups, halogen atoms, trifluoromethyl groups or hydrogen atoms and $R''_3$ represents a di-lower alkylamino group or a piperidino, pyrrolidino, morpholino, thiomorpholino or N'-methylpiperazino group which may be C-lower alkylated and alk denotes a lower alkylene radical with at most 3 carbon atoms, especially the methylene radical, and above all compounds of the last-mentioned formula wherein one of the radicals $R''_1$ and $R''_2$ represents a methyl or methoxy group or a chlorine atom or preferably a hydrogen atom and the other represents a hydrogen atom, $R''_0$ denotes the acetyl or propionyl radical, alk denotes the methylene radical and $R''_3$ denotes the dimethylamino, diethylamino, pyrrolidino or piperidino radical.

Here, the following compounds should be especially mentioned:

1-phenyl-2-(p-methoxyphenyl)-2-propionyloxy-3-(di-methylaminomethyl)-3-butene,
1-(p-chlorophenyl)-2-phenyl-2-propionyloxy-3-(dimethylaminomethyl)-3-butene,
1-(p-methoxyphenyl)-2-phenyl-2-propionyloxy-3-(dimethylaminomethyl)-3-butene,
1,2-diphenyl-2-acetoxy-3-(N'-methyl-piperazinomethyl)-3-butene,
1,3-diphenyl-3-propionyloxy-4-(dimethylaminomethyl)-4-pentene,
3,4-diphenyl-4-propionyloxy-5-(dimethylaminomethyl)-5-hexene,
especially 1-(o-methylphenyl)-2-phenyl-2-propionyloxy-3-(dimethylaminomethyl)-3-butene,
1-(o-methylphenyl)-2-phenyl-2-acetoxy-3-(dimethylaminomethyl)-3-butene,
1-(o-methylphenyl)-2-phenyl-2-acetoxy-3-(pyrrolidinomethyl)-3-butene,
1,2-diphenyl-2-acetoxy-3-(dimethylaminomethyl)-3-butene,
1,2-di-phenyl-2-acetoxy-3-(piperidinomethyl)-3-butene,
1,2-diphenyl-2-acetoxy-3-(diethylaminomethyl)-3-butene,
1,2-diphenyl-2-acetoxy-3-(pyrrolidinomethyl)-3-butene and preferably 1,2-diphenyl-2-propionyloxy-3-(dimethylaminomethyl)-3-butene of the formula

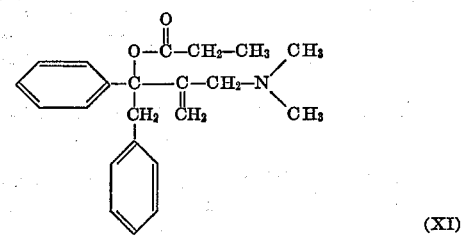

especially in their dextro-rotary form.

Particularly preferred preparations are those which contain one of the ethenoanthracene or ethanoanthracene compounds mentioned above and one of the compounds of the general Formula I mentioned above, and especially preparations which contain 9-(methylaminomethyl)-9,10-dihydro-9,10-ethanoanthracene or -ethenoanthracene, 9-(γ-methylaminopropyl)-9,10-dihydro-9,10-ethanoanthracene or -ethenoanthracene or 9-(γ-dimethylaminopropyl)-9,10-dihydro-9,10-ethenoanthracene and α-1,2-diphenyl-2-propionyloxy-3-methyl-4-dimethylaminobutane or especially 1,2-diphenyl-2-propionyloxy-3-(dimethylaminomethyl)-3-butene (with the two last-mentioned compounds preferably being present in their dextro-rotatory form). A very particular subject of the present invention are accordingly such preparations, their use or the use of the individual components in a combination therapy.

In the preparation of the invention, the ratio of the analgesic component to the psychopharmacological component can vary within wide limits.

The dosage of the preparations of the invention naturally depends on the activity of the particular active substances, on the nature of the pain to be combated and on the individual requirements of the patient. For example, in the case of the analgesic component, it can be between half an individual dose and a single individual dose, ½ to ⅔ of the individual dose preferably being used. Thus, for example, in the case of oral administration the above-mentioned preferred preparations can contain from 75 to 150 mg., especially from 75 to 100 mg., of dl-1,2-diphenyl-2-propionyloxy-3-(dimethylaminomethyl) - 3-butene hydrochloride or from 50 to 100 mg., especially from 50 to 67 mg., of d-1,2-diphenyl-2-propionyloxy - 3 - (dimethylaminomethyl)-3-butene maleate. The dosage of the psychopharmacologically active component can lie between half the twice the individual dose, and preferably between half and one single dose is used. Thus, for example, for oral administration the above-mentioned preferred preparations can contain 5 to 20 mg., especially 5 to 10 mg., of 9-(methylaminomethyl)-9,10-dihydro-9,10-ethanoanthracene hydrochloride or -9,10-etheno-anthracene hydrochloride or 12.5 to 50 mg., espcially 12.5 to 25 mg., of 9-(γ-methylaminopropyl) - 9,10 - dihydro - 9,10-ethanoanthracene hydrochloride.

The pharmaceutical preparations of the invention are suitable for parenteral administration or especially for oral administration and may comprise the active substances in admixture or conjunction with a pharmaceutically suitable carrier, for example, water, colloidal silica, polyvinylpyrrolidone gelatine, lactose, starch, stearyl alcohol, magnesium stearate, talc, vegetable oils, benzyl alcohols, gum, propylene glycols, white petroleum jelly or other known pharmaceutically suitable carriers. The pharmaceutical preparations can, for example, be in the form of tablets, dragées or capsules or in a liquid form as solutions, for example, as an elixer or syrup, suspensions or emulsions. They may be sterilized and/or contain auxiliaries, for example, preservatives, stabilizers, wetting agents or emulsifiers, solubilizing agents or salts for regulating the osmotic pressure or buffers. They can also contain other pharmaceutically useful substances. The formulations for oral administration can also be varied to achieve a prolonged action. The pharmaceutical preparations are formulated according to customary methods.

The analgesically or psychopharmacologically active compounds mentioned are known or can be manufactured in a manner which is in iteself known. The term "known" means in actual use or described in the literature of the art.

The following examples illustrate the invention.

EXAMPLE 1

Tablets containing 5 mg. of 9-(methylaminomethyl)-9,10-dihydro-9,10-ethano - anthracene hydrochloride and 67 mg. of d-1,2-diphenyl-2-propionyloxy - 3 - (dimethylaminomethyl) - 3-butene maleate can, for example, be manufactured to have the following composition:

| Composition: | Mg. |
|---|---|
| 9 - (methylaminomethyl) - 9,10 - dihydro-9,10-ethano-anthracene hydrochloride | 5 |
| d-1,2-diphenyl -2 - propionyloxy - 3-(dimethyl-aminomethyl) - 3 - butene maleate | 67 |
| Lactose | 40 |
| Wheat starch | 30 |
| Polyvinylpyrrolidone | 6 |
| Microcrystalline cellulose | 48 |
| Colloidal silica | 2 |
| Calcium stearate | 2 |
| | 200 |

Manufacture

9 - (methylaminomethyl) - 9,10 - dihydro-9,10-ethano-anthracene hydrochloride and d-1,2-diphenyl-2-propionyloxy-3-(dimethylaminomethyl) - 3 - butene maleate are mixed with lactose and wheat starch. The mixture is sieved, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be varnished, if desired.

EXAMPLE 2

Tablets containing 10 mg. of 9-(methylaminomethyl)-9,10-dihydro-9,10-ethano-anthracene hydrochloride and 67 mg. of d-1,2-diphenyl-2-propionyloxy - 3-(dimethylaminomethyl)-3-butene maleate can, for example, be manufactured to have the following composition:

| Composition: | Mg. |
|---|---|
| 9-(methylaminomethyl) - 9,10 - dihydro-9,10-ethano-anthracene hydrochloride | 10 |
| d-1,2-diphenyl - 2 - propionyloxy-3-(dimethyl-aminomethyl)-3-butene maleate | 67 |
| Lactose | 35 |
| Wheat starch | 30 |
| Polyvinylpyrrolidone | 6 |
| Microcrystalline cellulose | 48 |
| Colloidal silica | 2 |
| Calcium stearate | 2 |
| | 200 |

Manufacture 9-(methylaminomethyl) - 9,10 - dihydro-9,10-ethano-anthracene hydrochloride and d-1-2-diphenyl-2-propionyloxy-3-dimethylaminomethyl)-3-butene maleate are mixed with lactose and wheat starch. The mixture is sieved, granulated with a solution of polyvinyl pyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be varnished, if desired.

EXAMPLE 3

Tablets containing 12.5 mg. of 9-(γ-methylaminopropyl)-9,10-dihydro - 9,10 - ethano-anthracene hydrochloride and 67 mg. of d-1,2-diphenyl-2-propionyloxy-3-(dimethylaminomethyl)-3-butene maleate can, for example, be manufactured to have the following composition:

| Composition: | Mg. |
|---|---|
| 9-(γ-methylaminopropyl)-9,10 - dihydro-9,10-ethano-anthracene hydrochloride | 12.5 |
| d-1,2-diphenyl - 2 - propionyloxy-3-(dimethyl-aminomethyl)-3-butene maleate | 67.0 |
| Lactose | 35.0 |
| Wheat starch | 30.0 |
| Polyvinylpyrrolidone | 6.0 |
| Microcrystalline cellulose | 45.5 |
| Colloidal silica | 2.0 |
| Calcium stearate | 2.0 |
| | 200.0 |

Manufacture 9-(γ-methylaminopropyl) - 9,10 - dihydro-9,10-ethano-anthracene hydrochloride and d-1,2-diphenyl-2-propionyloxy-3-(dimethylaminomethyl) - 3 - butene maleate are mixed with lactose and wheat starch. The mixture is seived, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be varnished, if desired.

EXAMPLE 4

Tablets containing 5 mg. of 9-(methylaminomethyl)-9,10-dihydro-9,10-ethano-anthracene hydrochloride and 100 mg. of dl-1,2 - diphenyl-2-propionyloxy-3-(dimethylaminomethyl)-3-butene hydrochloride can, for example, be manufactured to have the following composition:

Composition: Mg.
9-(methylaminomethyl)-9,10 - dihydro - 9,10-ethano-anthracene hydrochloride _____ 5
dl-1,2-diphenyl-2-propionyloxy - 3 - (dimethylaminomethyl)-3-butene hydrochloride _____ 100
Microcrystalline cellulose _____ 75
Anhydrous lactose _____ 75
Colloidal silica _____ 2
Calcium stearate _____ 3
                                                260

Manufacture

All substances are sieved and mixed. The mixture is pressed into tables weighing 260 mg. and having a breaking notch. The tablets can be varnished, if desired.

EXAMPLE 5

Tables containing 5 mg. of 9-(methylaminomethyl)-9,10-dihydro-9,10-etheno-anthracene hydrochloride and 67 mg. of d - 1,2-diphenyl-2-propionyloxy-3-(dimethylaminomethyl-3-butene maleate can, for example, be manufactured to have the following composition:

Composition: Mg.
9 - (methylaminomethyl) - 9,10-dihydro - 9,10-ethenoanthracene hydrochloride _____ 5
d-1,2-diphenyl-2-propionyloxy - 3 - (dimethylaminomethyl)-3-butene maleate _____ 67
Lactose _____ 40
Wheat starch _____ 30
Polyvinylpyrrolidone _____ 6
Microcrystalline cellulose _____ 48
Colloidal silica _____ 2
Calcium stearate _____ 2
                                                200

Manufacture 9-(methylaminomethyl)-9,10-dihydro - 9,10 - ethenoanthracene hydrochloride and d-1,2-diphenyl-2-propionyloxy-3-(dimethylaminomethyl) - 3 - butene maleate are mixed with lactose and wheat starch. The mixture is sieved, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tables can be varnished, if desired.

EXAMPLE 6

Tablets containing 5 mg. of 9-(α-methylaminopropyl)-9,10 - dihydro-9,10-ethenoanthracene hydrochloride and 67 mg. of d-1,2-diphenyl-2-propionyloxy-3-(dimethylaminomethyl)-3- butene maleate can, for example, be manufactured to have the following composition:

Composition: Mg.
9-(α-methylaminopropyl) - 9,10 - dihydro-9,10-ethenoanthracene hydrochloride _____ 5
d-1,2-diphenyl-2-propionyloxy - 3 - (dimethylaminomethyl)-3-butene maleate _____ 67
Lactose _____ 40
Wheat starch _____ 30
Polyvinylpyrrolidone _____ 6
Microcrystalline cellulose _____ 48
Colloidal silica _____ 2
Calcium stearate _____ 2
                                                200

Manufacture 9-(γ-methylaminopropyl)-9,10-dihydro - 9,10 - ethenoanthracene hydrochloride and d-1,2-diphenyl-2-propionyloxy-3-(dimethylaminomethyl)-3-butene maleate are mixed with lactose and wheat starch. The mixture is sieved, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be vanished, if desired.

EXAMPLE 7

Tablets containing 5 mg. of 9-(γ-dimethylaminopropyl)-9,10-dihydro-9,10-etheno - anthracene hydrochloride and 67 mg. of d-1,2-diphenyl-2-propionyloxy-3-(dimethylaminomethyl)-3-butene maleate can, for example, be manufactured to have the following composition:

Composition: Mg.
9-(γ-dimethylaminopropyl) - 9,10-dihydro-9,10-ethenoanthracene hydrochloride _____ 5
d-1,2-diphenyl-2-propionyloxy - 3 - (dimethylaminomethyl)-3-butene maleate _____ 67
Lactose _____ 40
Wheat starch _____ 30
Polyvinylpyrrolidone _____ 6
Microcrystalline cellulose _____ 48
Colloidal silica _____ 2
Calcium stearate _____ 2
                                                200

Manufacture 9-(γ-dimethylaminopropyl)-9,10 - dihydro-9,10-ethenoanthracene hydrochloride and d-1,2-diphenyl-2-propionyloxy-3-(dimethylaminomethyl) - 3 - butene maleate are mixed with lactose and wheat starch. The mixture is sieved, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be varnished, if desired.

EXAMPLE 8

Tablets containing 5 mg. of 9-(β-methylaminoethoxy)-9,10-dihydro-9,10-ethanoanthracene hydrochloride and 67 mg. of d-1,2-diphenyl-2-propionyloxy-3-(dimethylaminomethyl)-3-butene maleate can, for example, be manufactured to have the following composition:

Composition: Mg.
9-(β-methylaminoethoxy)-9,10 - dihydro - 9,10-ethnoanthracene hydrochloride _____ 5
d-1,2-diphenyl-2-propionyloxy - 3 - (dimethylaminomethyl)-3-butene maleate _____ 67
Lactose _____ 40
Wheat starch _____ 30
Polyvinylpyrrolidone _____ 6
Microcrystalline cellulose _____ 48
Colloidal silica _____ 2
Calcium stearate _____ 2
                                                200

Manufacture

9 - (β - methylaminoethoxy) - 9,10 - dihydro - 9,10-ethanoanthracene hydrochloride and d-1,2-diphenyl-2-propionyloxy-3 - (dimethylaminomethyl) - 3 - butene maleate are mixed with lactose and wheat starch. The mixture is sieved, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be varnished, if desired.

EXAMPLE 9

Tablets containing 5 mg. of 9-(methylaminomethyl)-9,10-dihydro - 9,10 - ethanoanthracene hydrochloride and 60 mg. of dl-1,2-diphenyl-2-acetoxy-3-(pyrrolidinomethyl)-3-butene hydrochloride can, for example, be manufactured to have the following composition:

| Composition: | Mg. |
|---|---|
| 9 - (methylaminomethyl) - 9,10 - dihydro - 9,10-ethanoanthracene hydrochloride | 5 |
| dl - 1,2 - diphenyl - 2 - acetoxy - 3 - pyrrolidinomethyl)-3-butene hydrochloride | 60 |
| Lactose | 47 |
| Wheat starch | 30 |
| Polyvinylpyrrolidone | 6 |
| Microcrystalline cellulose | 48 |
| Colloidal silica | 2 |
| Calcium stearate | 2 |
| | 200 |

Manufacture

9 - (methylaminomethyl) - 9,10 - dihydro - 9,10 - ethanoanthracene hydrochloride and dl-1,2-diphenyl-2-acetoxy-3-(pyrrolidinomethyl)-3-butene hydrochloride are mixed with lactose and wheat starch. The mixture is sieved, granulated with a solution of polyvinylpyrrolidone in methylene chloride and dried. The dry granules are sieved and homogeneously mixed with microcrystalline cellulose, colloidal silica and calcium stearate, and the mixture is pressed into tablets weighing 200 mg. and having a breaking notch.

The tablets can be varnished, if desired.

What is claimed is:

1. A pharmaceutical preparation which comprises 50–150 mg. of 1,2-diphenyl-2-propionyloxy-3-(dimethylaminomethyl)-3-butene in the free form or in the form of a physiologically tolerable salt in admixture with 5–50 mg. of a compound of the formula

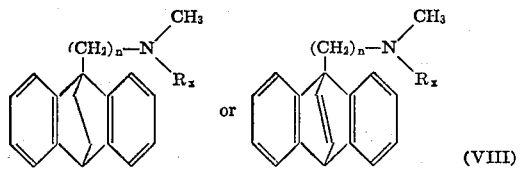

(VIII)

wherein $n$ represents 1 or 3 and $R_x$ denotes a hydrogen atom, in the free form or in the form of a physiologically tolerable salt in admixture or conjunction with a pharmaceutically suitable carrier.

2. A pharmaceutical preparation as claimed in claim 1, which comprises 75–150 mg. of 1,2-diphenyl-2-propionyloxy-3-(dimethylaminomethyl)-3-butene in the free form or in the form of a physiologically tolerable salt in admixture with 5–20 mg. of 9-(methylaminomethyl)-9,10-dihydro-9,10-ethanoanthracene in the free form or in the form of a physiologically tolerable salt.

3. A pharmaceutical preparation as claimed in claim 1, which comprises 75–150 mg. of 1,2-diphenyl-2-propionyloxy-3-(dimethylaminomethyl)-3-butene in the free form or in the form of a physiologically tolerable salt and 12.5–50 mg. of 9-(γ-methylaminopropyl)-9,10-dihydro-9,10-ethanoanthracene in the free form or in the form of a physiologically tolerable salt.

4. A pharmaceutical preparation as claimed in claim 1, which comprises 75–150 mg. of 1,2-diphenyl-2-propionyloxy-3-(dimethylaminomethyl)-3-butene in the free form or in the form of a physiologically tolerable salt and 5–20 mg. of 9 - (methylaminomethyl) - 9,10 - dihydro-9,10-ethenoanthracene in the free form or in the form of a physiologically tolerable salt.

5. A pharmaceutical preparation as claimed in claim 1, which comprises 75–150 mg. of 1,2-diphenyl-2-propionyloxy-3-(dimethylaminomethyl)-3-butene in the free form or in the form of a physiologically tolerable salt and 12.5–50 mg. of 9-(γ-methylaminopropyl)-9,10-dihydro-9,10-ethenoanthracene in the free form or in the form of a non-toxic salt.

6. A pharmaceutical preparation as claimed in claim 1, wherein from 75 to 150 mg. of dl-1,2-diphenyl-2-propionyloxy-3-(dimethylaminomethyl)-3-butene hydrochloride are present.

7. A pharmaceutical preparation as claimed in claim 6, wherein from 75 to 100 mg. of the butene hydrochloride are present.

8. A pharmaceutical preparation as claimed in claim 1, wherein from 50 to 100 mg. of d-1,2-diphenyl-2-propionyloxy-3-(dimethylaminomethyl)-3-butene maleate are present.

9. A pharmaceutical preparation as claimed in claim 8, wherein from 50 to 67 mg. of the butene maleate are present.

10. A pharmaceutical preparation as claime in claim 1, wherein from 5 to 20 mg. of g-(methylaminomethyl)-9,10-dihydro - 9,10 - ethanoanthracene hydrochloride or -9,10-ethenoanthracene hydrochloride are present.

11. A pharmaceutical preparation as claimed in claim 10, wherein from 5 to 10 mg. of the -9,10-ethanoanthracene hydrochloride or -9,10-ethenoanthracene hydrochloride are present.

12. A pharmaceutical preparation as claimed in claim 1, wherein from 12.5 to 50 mg. of 9-(γ-methylaminopropyl)-9,10-dihydro - 9,10 - ethanoanthracene hydrochloride is present.

13. A pharmaceutical preparation as claimed in claim 12, wherein from 12.5 to 25 mg. of the -9,10-ethanoanthracene hydrochloride is present.

14. A pharmaceutical preparation as claimed in claim 1, which comprises from 50 to 100 mg. of d-1,2-diphenyl-2-propionyloxy-3-(dimethylaminomethyl)-3-butene maleate and from 5 to 20 mg. of 9-(methylaminomethyl)-9,10-dihydro-9,10-ethanoanthracene hydrochloride.

15. A pharmaceutical preparation as claimed in claim 1, which comprises 50 to 100 mg. of d-1,2-diphenyl-2-propionyloxy-3 - (dimethylaminomethyl) - 3 - butene maleate and from 12.5 to 50 mg. of 9-(γ-methylaminopropyl)-9,10-dihydro-9,10-ethanoanthracene hydrochloride.

References Cited

UNITED STATES PATENTS

| 3,399,201 | 8/1968 | Schmidt et al. | 260—570.8 TC |
| 3,489,799 | 1/1970 | Schmidt et al. | 260—570.8 TC |
| 2,728,779 | 12/1955 | Pobland | 260—326.3 |

OTHER REFERENCES

Amer. Drug. Index, 1970, p. 160.

STANLEY J. FRIEDMAN, Primary Examiner

U.S. Cl. X.R.

424—244, 246, 248, 250, 267, 274, 330